(12) United States Patent
Okamoto et al.

(10) Patent No.: US 10,528,504 B2
(45) Date of Patent: Jan. 7, 2020

(54) CONNECTION DEVICE RESTRICTION SYSTEM

(71) Applicant: Hitachi, Ltd., Tokyo (JP)

(72) Inventors: Tatsuya Okamoto, Tokyo (JP);
Takayuki Kameda, Tokyo (JP);
Ryuutarou Tomozawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/412,550

(22) Filed: May 15, 2019

(65) Prior Publication Data

US 2019/0370201 A1 Dec. 5, 2019

(30) Foreign Application Priority Data

May 31, 2018 (JP) ................. 2018-104284

(51) Int. Cl.
*G06F 21/12* (2013.01)
*G06F 13/38* (2006.01)
*G06F 21/56* (2013.01)
*G06F 21/57* (2013.01)

(52) U.S. Cl.
CPC ............ *G06F 13/382* (2013.01); *G06F 21/56* (2013.01); *G06F 21/57* (2013.01); *G06F 2213/0042* (2013.01)

(58) Field of Classification Search
CPC ................................ G06F 21/30; G06F 21/123
See application file for complete search history.

(56) References Cited

U.S. PATENT DOCUMENTS

| | | | | |
|---|---|---|---|---|
| 2006/0143716 A1* | 6/2006 | Ikemoto | .................. | G06F 21/57 726/27 |
| 2007/0250908 A1* | 10/2007 | Sim | .......... | H04L 63/08 726/3 |
| 2010/0293306 A1 | 11/2010 | Ikemoto | | |
| 2013/0055044 A1* | 2/2013 | Eljezovic | ............ | G06F 11/1004 714/758 |
| 2018/0309683 A1* | 10/2018 | Chan | ....................... | H04L 47/24 |

FOREIGN PATENT DOCUMENTS

JP 2006-185218 A 7/2006

\* cited by examiner

*Primary Examiner* — Farley Abad
(74) *Attorney, Agent, or Firm* — Mattingly & Malur, PC (57) ABSTRACT

A control unit makes a connection state between a connection device connected to a connection management device and an electronic device when a determination unit determines that identification information of the connection device connected to the connection management device has been registered in a connection work plan and a connection history of a connection order preceding a connection order of the connection device is "connected", and does not make the connection state between the connection device connected to the connection management device and the electronic device when it is determined that the connection history of the connection order preceding the connection order of the connection device is "unconnected".

4 Claims, 5 Drawing Sheets

CONNECTION DEVICE RESTRICTION SYSTEM

CROSS-REFERENCE TO RELATED APPLICATION

The present application claims priority from Japanese application JP 2018-104284, filed on May 31, 2018, the contents of which is hereby incorporated by reference into this application.

BACKGROUND OF THE INVENTION

1. Field of the Invention

The present invention relates to a connection device restriction system when using a connection device such as a USB memory, and more particularly to a connection device restriction system of a connection device to be used by being connected to an electronic device such as a computer.

2. Description of the Related Art

In recent years, storage media typified by universal serial bus (USB) memories (hereinafter generally referred to as the USB memories) have been used, as connection devices to transfer data, in various fields from the viewpoint of excellent interoperability and ease of portability. Meanwhile, due to the above-described properties, the use of the USB memories has a security risk that malware may be mixed into an electronic device such as a computer which is a connection target For example, an operation in which a USB memory to be used is once connected to a quarantine device to quarantine presence or absence of malware infection and the USB memory is connected to a computer or the like, which is a connection target, after confirming the safety of the USB memory has been considered in order to reduce the security risk at the time of using the USB memory.

Further, as a technique for reducing the security risk at the time of using the connection device, JP 2006-185218 A describes a technique in which "device information is acquired from a connection device when the connection device is connected to a connection port, whether the connection device corresponds to a connection-permitted device defined in a connection permission list is collated, and connection is permitted only when the connection device corresponds to the connection-permitted device".

SUMMARY OF THE INVENTION

In the technique described in JP 2006-185218 A, however, there is a risk that a connection device infected with malware may be regarded as the device corresponding to the connection-permitted device and connected to a connection target such as a computer although it is possible to prevent use of an unnecessary connection device by defining the connection permission list of connection devices.

Therefore, an object of the present invention is to set a connection work plan in which a connection order is determined in advance such that a connection device to be used for a computer or the like is obligatorily connected to a quarantine device and then connected to the computer or the like, and to connect the connection device to a connection target according to the connection work plan.

In order to solve the above problem, a connection device restriction system according to the present invention includes: connection management devices each of which includes a connection port to connect a connection device and connects the connection device connected to the connection port to an electronic device; a control unit which controls a connection state between the connection device and the electronic device in the connection management device; a setting unit which sets a connection work plan in which identification information of the connection device and a connection order defining an order of the connection management devices to be connected with the connection device have been registered in advance; a storage unit which stores the connection work plan set by the setting unit; a determination unit which acquires connection information on the connection device connected to the connection management device and collates the acquired connection information with the connection work plan; and a history update unit which changes a connection history corresponding to the connection order of the connection work plan from "unconnected" to "connected" when the connection device is connected to the electronic device. The control unit makes the connection state between the connection device connected to the connection management device and the electronic device when the determination unit determines that the identification information of the connection device connected to the connection management device has been registered in the connection work plan and a connection history of a connection order preceding a connection order of the connection device is "connected", and does not make the connection state between the connection device connected to the connection management device and the electronic device when the determination unit determines that the connection history of the connection order preceding the connection order of the connection device is "unconnected".

According to the connection device restriction system of the present invention, it is possible to prevent the connection order of the connection device from deviating from the connection work plan in which the connection order of the connection devices has been determined in advance and to reduce a security risk that malware may be mixed into the electronic device such as a computer serving as a connection target of the connection device.

DESCRIPTION OF THE PREFERRED EMBODIMENTS

Hereinafter, an embodiment (hereinafter referred to as the present example) of a connection device restriction system according to the present invention will be described with reference to the drawings.

Figure 1:
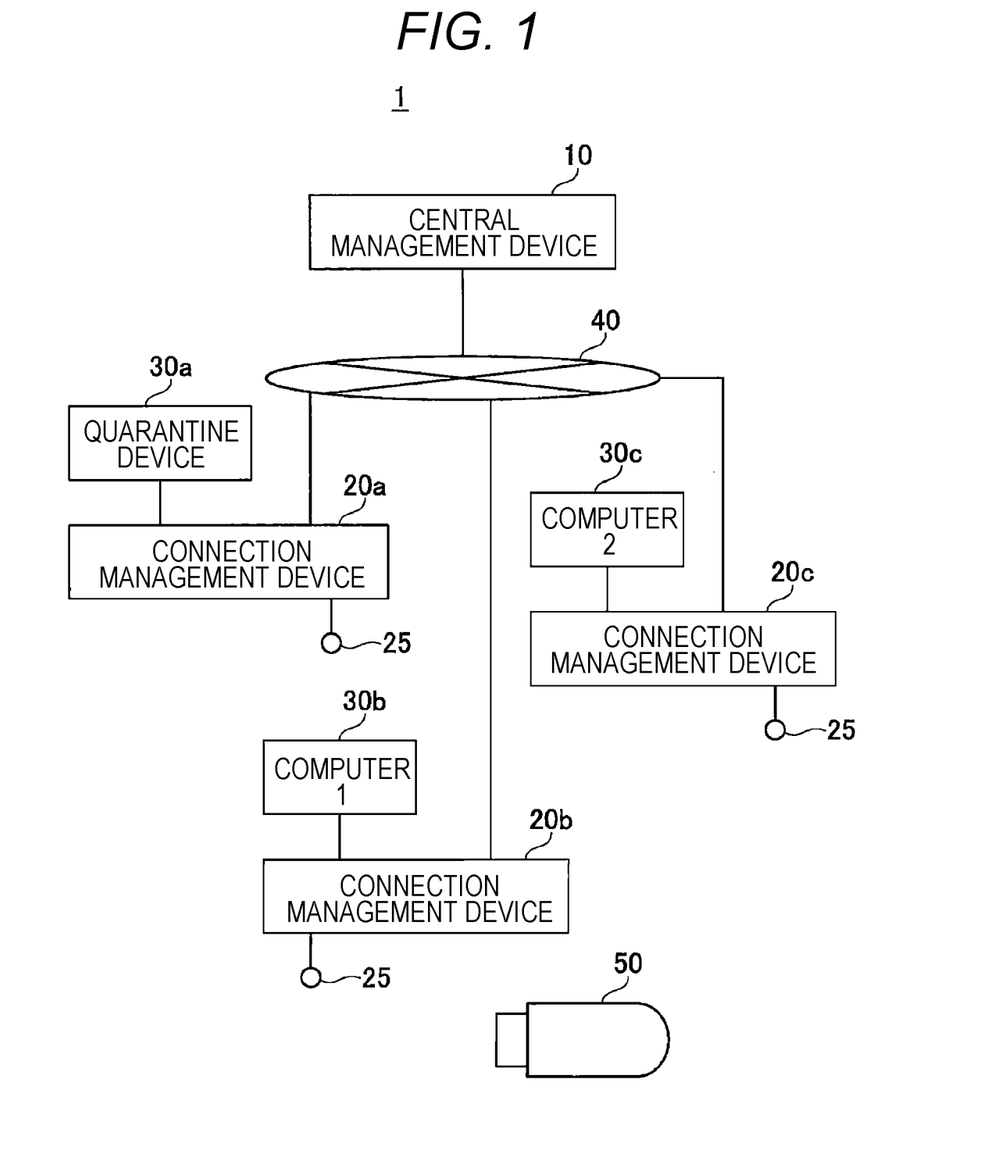
FIG. 1 is a configuration diagram of a connection device restriction system according to an embodiment of the present invention.

FIG. 1 is a configuration diagram of a connection device restriction system 1 according to the present example.

As illustrated in FIG. 1, the connection device restriction system 1 according to the present example includes: a central management device 10; a plurality of connection management devices 20a to 20c; a quarantine device 30a serving as an electronic device connected to the connection management device 20a; a computer 30b (computer 1) serving as an electronic device connected to the connection management device 20b; a computer 30c (computer 2) serving as an electronic device connected to the connection management device 20c; connection ports 25 provided in the respective connection management devices 20; and a network 40.

A USB memory 50 having a USB interface, for example, is connected as a connection device to the connection port 25 provided in each of the connection management devices 20.

The central management device 10 is configure to manage a state of each of the connection management devices 20a to 20c connected to the network 40 and controls a connection state of the USB memory 50 connected to each of the connection management devices 20 with respect to each of the quarantine device 30a, the computer 30b, and the computer 30c which are connection targets of the USB memory 50.

The connection management device 20 makes a connection between the USB memory 50 connected to the connection management device 20 and a connection target 30 connected to the connection management device 20. The connection target 30 and the connection management device 20 are connected via the USB interface.

The connection management device 20 has a function of notifying the connection management device 20 of the connection of the USB memory 50 with respect to the central management device 10 and a function of controlling a connection state between the USB memory 50 and the connection target 30 in response to an instruction from the central management device 10. Incidentally, the connection management device 20 is illustrated as hardware in the present example, but may be software implemented in the computers 30b and 30c, for example.

The connection port 25 is configured to allow the USB memory 50 to be mounted thereto so as to connect the USB memory 50 to the connection management device 20.

The quarantine device 30a is a device that detects and removes infected malware or the like in the USB memory 50 connected to the connection management device 20.

The computers 30b and 30c may be not only PCs such as PC/AT compatible machines having calculation functions, PDAs, and mobile terminals but also printers serving as electronic devices, multi-function peripherals (MFP), multi-function printers, or the like.

In the present example, all the USB ports which are not connected to the connection management devices 20 among the USB ports included in the connection targets 30 (not illustrated) are blocked to be in an unusable state. As a result, the USB memory 50 is connected to the connection port 25 of the connection management device 20, and is in the state of being always connected to the connection target 30 via the connection management device 20.

The network 40 is an IP network such as a local area network (LAN), and is connected to the central management device 10 and the plurality of connection management devices 20. That is, the central management device 10 is connected to all the connection management devices 20 via the network 40 in the present example, and thus, the central management device 10 can communicate with each of the connection management devices 20 on the network 40.

Figure 2:
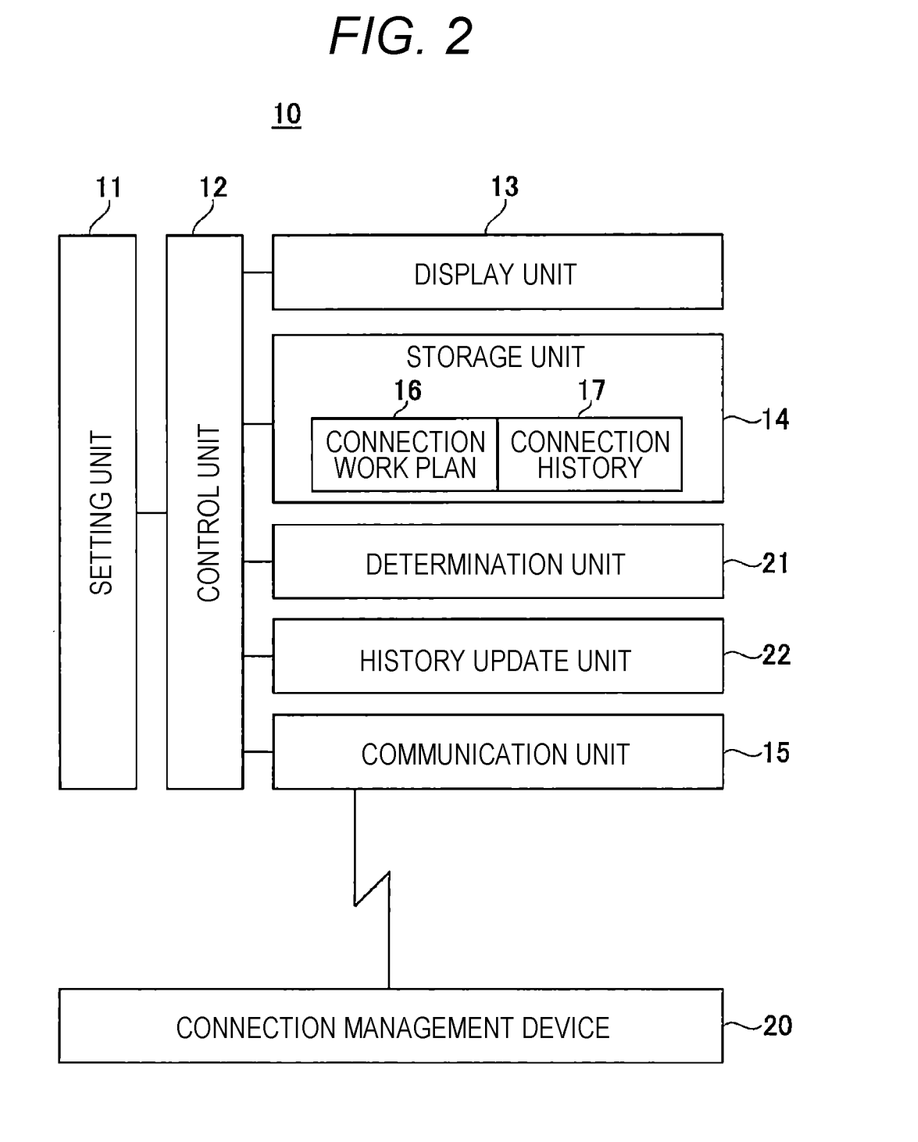
FIG. 2 is a block diagram illustrating a functional configuration of a central management device according to the embodiment of the present invention.

FIG. 2 is a block diagram illustrating a functional configuration of the central management device 10 according to the present example.

As illustrated in FIG. 2, the central management device 10 according to the present embodiment includes a setting unit 11 including an input device, a control unit 12, a display unit 13, a storage unit 14 storing a connection work plan 16 and a connection history 17, a communication unit 15, a determination unit 21, and a history update unit 22.

The control unit 12 includes an arithmetic device such as a central processing unit (CPU) and performs overall control of processing operations of the respective units of the central management device 10. The control unit 12 reads various processing programs stored in the storage unit 14 and performs various processes based on various kinds of information received by the communication unit 15. Further, the control unit 12 monitors a state of each of the connection management devices 20 and controls a connection state between the USB memory 50 in each of the connection management devices 20 and the connection target 30 via the communication unit 15.

The input device of the setting unit 11 includes a touch panel formed so as to cover a display screen of the display unit 13 and various operation buttons such as numeric buttons and a start button, and inputs an operation signal based on an operation of a user and content of the connection work plan 16 received from a work planner to the control unit 12.

The display unit 13 is configured using a liquid crystal display (LCD) as a user interface, and displays various screens in response to an instruction of a display signal input from the control unit 12.

The storage unit 14 includes storage devices such as a nonvolatile semiconductor memory and a hard disk, and stores data and the like relating to various processes. Further, the storage unit 14 stores programs and data of processing to be executed by the control unit 12. In the present example, not only the connection work plan 16 input via the setting unit 11 but also the connection history 17 as a result of determination on whether to connect the connection target 30 and the USB memory 50 obtained by the determination unit 21 is stored and accumulated.

The communication unit 15 transmits and receives data to and from the connection management device 20 connected to the network 40 and other external devices. For example, the communication unit 15 performs communication with each of the connection management devices 20, and receives connection information on the USB memory 50 transmitted from the connection management device 20.

The connection information is information on the connection management device 20 and the USB memory 50 to be notified by the connection management device 20 to the central management device 10 when the USB memory 50 is connected to the connection port 25 of the connection management device 20.

The connection information is information including at least a connection time, a connection device ID, and a connection management device ID as a set. Here, the connection time is a time at which the USB memory 50 is connected to the connection management device 20. The connection device ID is information capable of uniquely identifying the USB memory 50 connected to the connection management device 20. The connection management device ID is information capable of uniquely identifying the connection management device 20 that has notified the central management device 10 of the connection information.

The determination unit 21 collates the connection information acquired via the communication unit 15 with the connection work plan 16 stored in the storage unit 14 to perform determination on whether to connect the USB memory 50 to the connection target 30.

The history update unit 22 changes the connection history 17 corresponding to the connection target 30 in the connection work plan 16 stored in the storage unit 14 when the connection target 30 and the USB memory 50 are connected.

Figure 3:
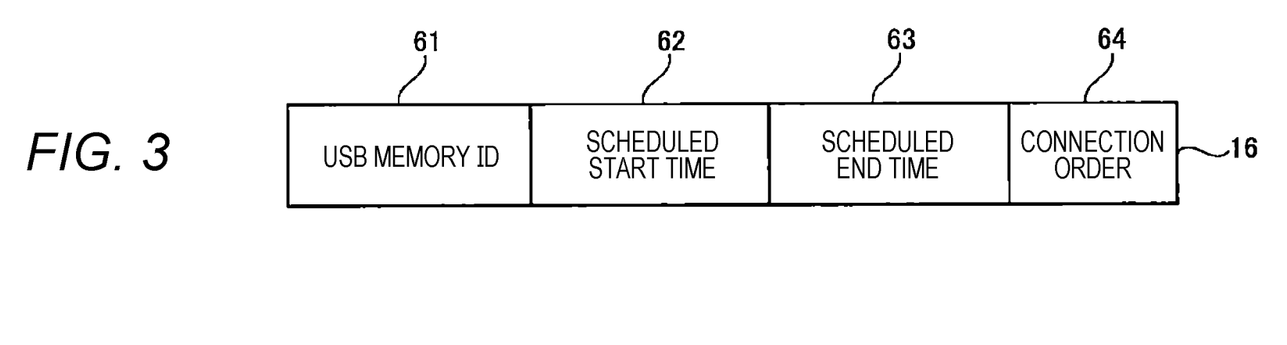
FIG. 3 is an example of a connection work plan according to the embodiment of the present invention.

FIG. 3 illustrates an example of the connection work plan 16 according to the present example.

FIG. 3 illustrates a data structure of the connection work plan 16 of the present example, the example in which the USB memory 50 is used as the connection device. The data structure of the connection work plan 16 of the present example is configured as a set of information including at least a USB memory ID 61, a scheduled start time 62, a scheduled end time 63, and a connection order 64.

The memory ID 61 is information capable of uniquely identifying the USB memory 50 connected to the connection management device 20, and for example, it is possible to use information independently assigned by a vendor or a serial number defined by a USB standard.

The scheduled start time 62 is the first time at which the connection of the USB memory 50 to the connection management device 20 has been permitted, and the scheduled end time 63 is the last time at which the connection of the USB memory 50 to the connection management device 20 has been permitted. Therefore, a connection restriction period during which it is permitted to connect the USB memory 50 to the connection management device 20 to be connected to the connection target 30 is determined depending on a difference between the scheduled end time 63 and the scheduled start time 62.

The connection order 64 defines the order of connecting the USB memory 50 to the plurality of connection management devices 20.

Figures 4A, 4B:
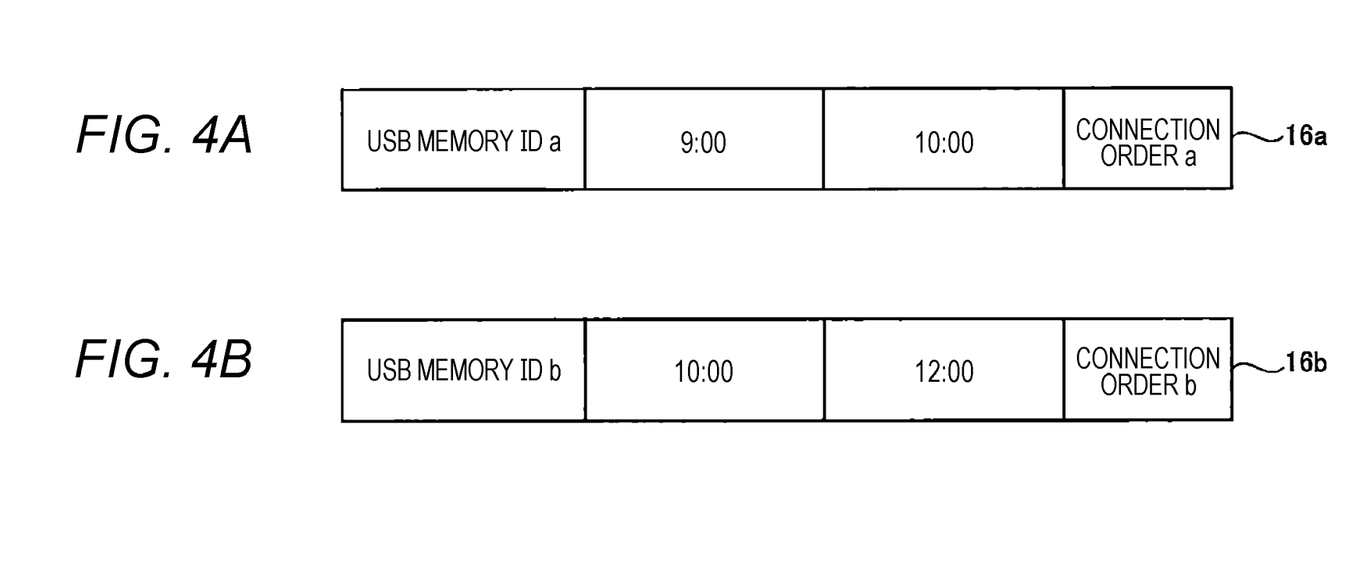
FIGS. 4A and 4B are examples of the connection work plan according to the embodiment of the present invention.

FIGS. 4A and 4B are examples illustrating the content of the connection work plan 16 illustrated in FIG. 3 in detail.

In a connection work plan 16a illustrated in FIG. 4A, scheduled start time and end time of a USB memory having a USB memory ID of a are set to 9:00 and 10:00, respectively, and a connection restriction period of the USB memory is one hour.

In a connection work plan 16b illustrated in FIG. 4B, scheduled start time and end time of a USB memory having a USB memory ID of b are set to 10:00 and 12:00, respectively, and a connection restriction period of the USB memory is two hours.

Although the connection work plans 16a and 16b, different from each other, are set for the USB memories having the different USB memory IDs 61, respectively, in the present example, it is also possible to set the different connection work plans 16 by setting different scheduled start times 62 and scheduled end times 63 for the USB memory having the same USB memory ID 61.

Figure 5:
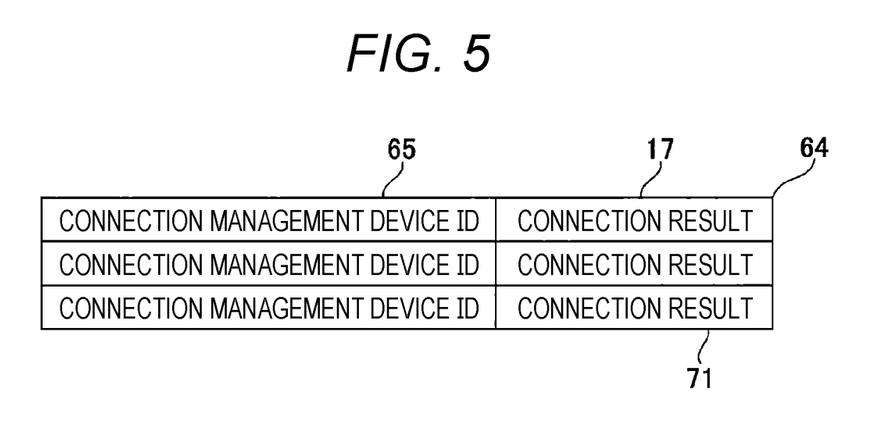
FIG. 5 is an example of the connection work plan according to the embodiment of the present invention.

FIG. 5 illustrates an example of the content of the connection order 64 of the connection work plan 16 illustrated in FIG. 3.

As illustrated in FIG. 5, the connection order 64 of the connection work plan 16 of the present example is obtained by aligning connection management devices ID 65 of the connection management devices 20 to which the USB memory 50 is to be connected in the order of connecting the USB memory 50. Further, the connection history 17 is provided to correspond to each of the connection management device IDs 65, and each connection result 71 is displayed.

The connection management device ID 65 is information capable of uniquely identifying the connection management device 20, and, for example, it is possible to use information independently assigned by a user, a serial number defined by a standard, or the like.

The connection history 17 illustrates the connection result 71 between the USB memory 50 and the connection target 30 in each of the connection management devices 20. Any value between "unconnected" and "connected" is taken as the connection result 71. Here, "unconnected" is an initial value that is set when the connection work plan 16 is recorded in the storage unit 14 by the work planner via the setting unit 11. Further, "connected" is rewritten from "unconnected" by the history update unit 22 when the USB memory 50 and the connection target 30 connected to the connection management device 20 are set to the connection state.

Figure 6:
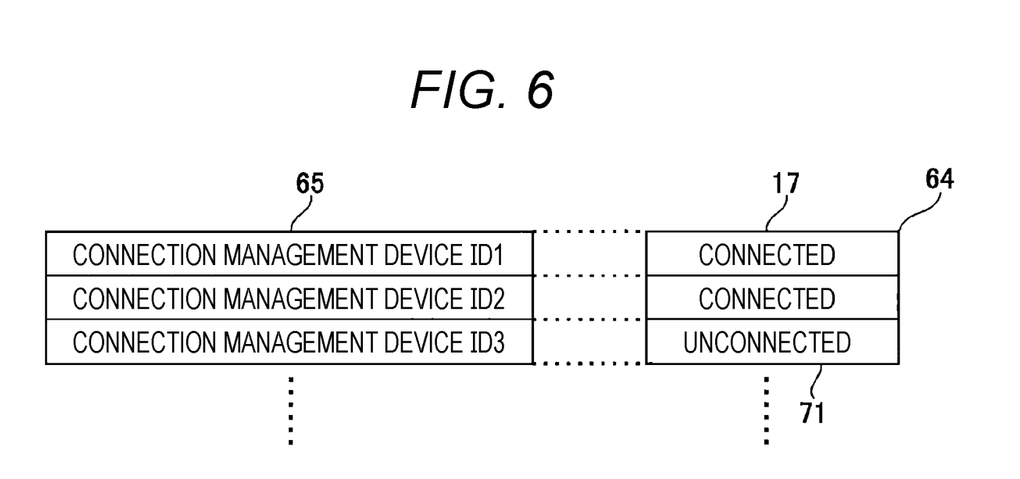
FIG. 6 is an example of the connection work plan according to the embodiment of the present invention.

FIG. 6 is an example illustrating the connection order 64 illustrated in FIG. 5 in detail.

The connection orders 64 illustrated in FIG. 6 are arranged in the order of a connection management device ID1, a connection management device ID2, and a connection management device ID3. That is, the USB memory 50 is planned to be connected in the order of the connection management device 20 having the connection management device ID1, the connection management device 20 having the connection management device ID2, and the connection management device 20 having the connection management device ID3 in the connection work plan 16 in the present example.

When a description is given with reference to FIG. 1, the quarantine device 30a is connected, as a connection target of the USB memory 50, to the connection management device 20a assigned with the connection management device ID1 in the present example That is, the USB memory 50 connected to the connection port 25 of the connection management device 20a is connected to the quarantine device 30a.

Further, the computer 30b (computer 1) is connected, as a connection target, to the connection management device 20b assigned with the connection management device ID2. That is, the USB memory 50 connected to the connection port 25 of the connection management device 20b is connected to the computer 1.

Further, the computer 30c (computer 2) is connected, as a connection target, to the connection management device 20c assigned with the connection management device ID3. That is, the USB memory 50 connected to the connection port 25 of the connection management device 20c is connected to the computer 2.

In the present example, the USB memory 50 can be connected to the quarantine device 30a for the first time by setting the first connection order 64 of the connection work plan 16 as the connection management device ID1 to which the quarantine device 30a is connected.

According to the connection history 17 of FIG. 6, the connection result 71 corresponding to the connection management device ID1 is displayed as "connected". Therefore, it is understood that the USB memory 50 has already been connected to the quarantine device 30a. Similarly, the connection result 71 corresponding to the connection management device ID2 is also displayed as "connected", and thus, it is understood that the USB memory 50 has already been connected to the computer 1. Further, the connection result 71 corresponding to the connection management device ID3 is displayed as "unconnected", it is understood that the USB memory 50 is in the state of not being connected to the computer 2 yet.

Next, a process of operating the connection device restriction system 1 according to the present example will be described with reference to FIG. 7.

Figure 7:
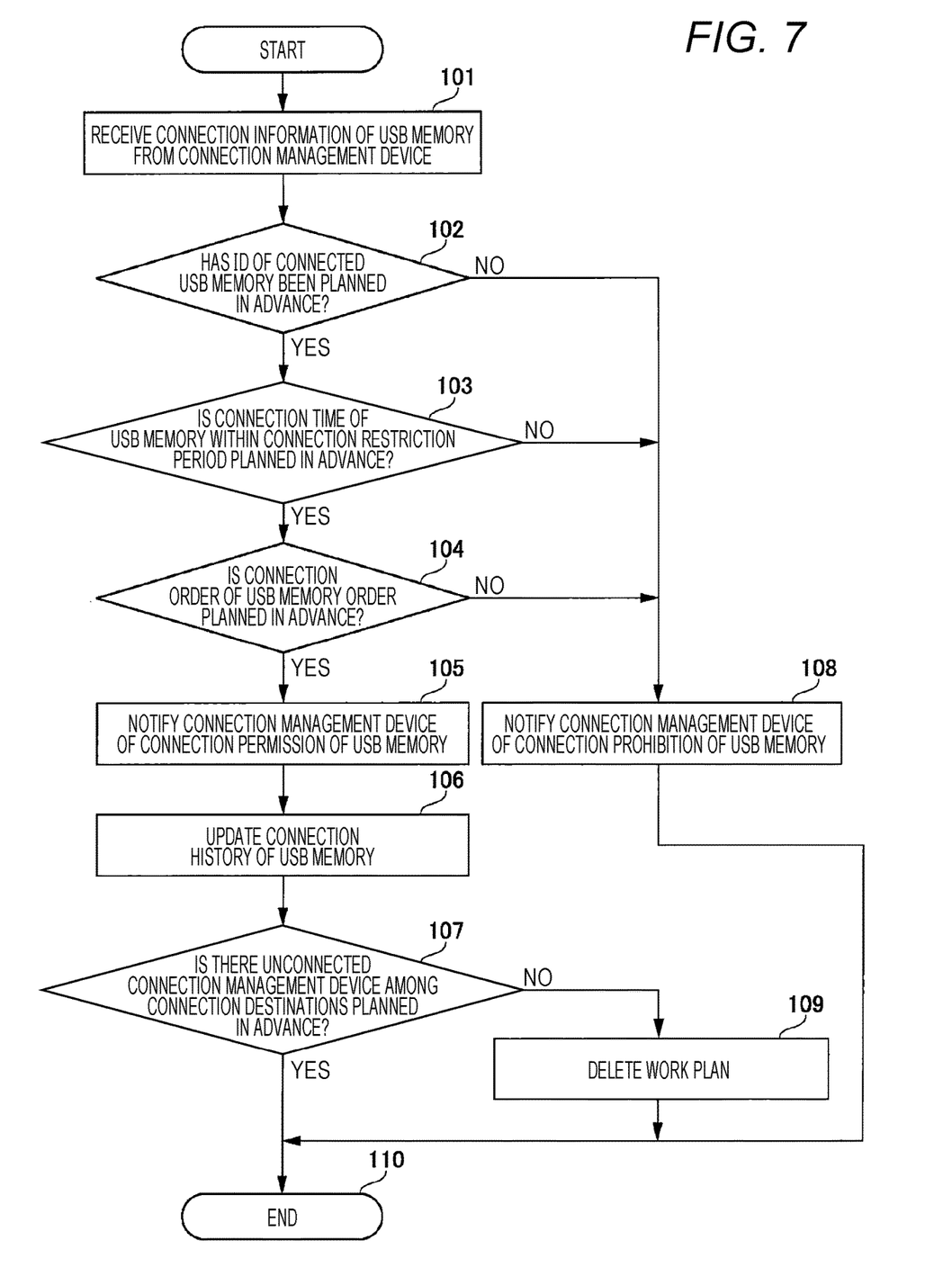
FIG. 7 is a flowchart of processing executed in the connection device restriction system according to the embodiment of the present invention.

FIG. 7 is a flowchart of connection management processing for managing connection of the USB memory 50 to the connection target 30 which is executed in the central management device 10 serving as an information processing device. This processing is realized by software processing by cooperation of the control unit 12 and an information processing program stored in the storage unit 14.

First, the central management device 10 receives connection information of the USB memory 50 from the connection management device 20 via the communication unit 15 (Step S101). The received connection information includes a connection management device ID (hereinafter referred to as a device ID) of the connection management device 20 to which the USB memory 50 has been connected, a USB memory ID (hereinafter referred to as a memory ID) of the USB memory 50 which has been connected to the connection management device 20, and a connection time at which the USB memory 50 has been connected to the connection management device 20.

Next, the determination unit 21 of the central management device 10 collates whether the memory ID included in the received connection information matches the USB memory ID 61 registered in the connection work plan 16 stored in the storage unit 14 to perform determination on whether connection of the USB memory 50 has been planned in advance (Step S102). When there is a plurality of the connection work plans 16 stored in the storage unit 14, the collation is performed in the order in which the connection work plans 16 have been registered in the storage unit 14. When it is determined that the received memory ID has been registered in the connection work plan 16 and the connection has been planned in advance (YES in Step S102), the determination unit 21 collates whether the connection time of the received connection information is included within a connection restriction period corresponding to the memory ID 61 (Step S103).

When it is determined in Step S102 that the memory ID received by the determination unit 21 has not been registered in the connection work plan 16 and the connection has not been planned in advance (NO in Step S102), the control unit 12 of the central management device 10 transmits a signal (non-permission signal) indicating that it is not permitted to connect the connected USB memory 50 to the connection target 30, via the communication unit 15, to the connection management device 20 and sets connection between the USB memory 50 connected to the connection management device 20 and the connection target 30 to a unconnected state (Step S108).

In Step S103, when the determination unit 21 determines that the connection time of the received connection information is included within the connection restriction period of the connection work plan 16 (YES in Step S103), the determination unit 21 determines whether the connection order 64 corresponding to the memory ID 61 registered in the connection work plan 16 stored in the storage unit 14 is the order that has been planned in advance (Step S104).

In Step S103, when the determination unit 21 determines that the connection time of the received connection information is not included within the connection restriction period of the connection work plan 16 (NO in Step S103), the central management device 10 transmits the signal (non-permission signal) indicating that it is not permitted to connect the connected USB memory 50 to the connection target, via the communication unit 15, to the connection management device 20 and sets connection between the USB memory 50 connected to the connection management device 20 and the connection target to the unconnected state (Step S108).

In Step S104, when the determination unit 21 determines that the connection order 64 corresponding to the memory ID 61 registered in the connection work plan 16 stored in the storage unit 14 is the order that has been planned in advance (YES in Step S104), the control unit 12 of the central management device 10 transmits a signal (permission signal) indicating that it is permitted to connect the connected USB memory 50 to the connection target, via the communication unit 15, to the connection management device 20 and sets connection between the USB memory 50 connected to the connection management device 20 and the connection target 30 to a connection state (Step S105).

In Step S104, when the determination unit 21 determines that the connection order 64 corresponding to the memory ID 61 registered in the connection work plan 16 is not the order that has been planned in advance (NO in Step S104), the control unit 12 of the central management device 10 transmits the signal (non-permission signal) indicating that it is not permitted to connect the connected USB memory 50 to the connection target 30, via the communication unit 15, to the connection management device 20 and sets connection between the USB memory 50 connected to the connection management device 20 and the connection target 30 to the unconnected state (Step S108).

Here, a procedure of the determination on whether the connection order 64 of the determination unit 21 is the order that has been planned in advance in Step S104 of the present example will be described in detail. First, the determination unit 21 collates whether all the connection results 71 of the connection histories 17 corresponding to the device ID 65 preceding the device ID 65 of the connection management device 20 to which the USB memory 50 has been connected are set to "connected" in the connection work plan 16. When all of the connection results 71 are "connected", the USB memory 50 determines that the connection order 64 is the order that has been planned in advance. On the other hand, when the connection results 71 include "unconnected", it is determined that the connection order 64 of the USB memory 50 is not the order that has been planned in advance.

Specifically, in the connection work plan 16*a* of FIG. 4A, the connection orders 64 of the USB memory 50 having the USB memory ID of a are planned in advance in the order of the connection management device ID1, the connection management device ID2, and the connection management device ID3 as illustrated in FIG. 6, the connection results 71 of the connection management device ID1 and the connection management device ID2 are set to the connected state, and the connection result 71 of the connection management device ID3 is set to the unconnected state. In this state, when the USB memory 50 having the USB memory ID of a is connected to the connection management device 20*c* having the connection management device ID3, the determination unit 21 determines that the USB memory 50 corresponds to the order that has been planned in advance since all the connection results 71 of the connection management device ID1 and the connection management device ID2 preceding the connection management device ID3 are "connected". On the other hand, when the connection result 71 of the connection management device ID1 is displayed as "connected" and the connection result 71 of the connection management device ID2 is displayed as "unconnected", the determination unit 21 determines that the USB memory 50 does not correspond to the order that has been planned in advance since the connection result 71 of the connection management device ID2 preceding the connection management device ID3 is "unconnected".

In Step S105, when the USB memory 50 and the connection target 30 are in the connection state, the history update unit 22 updates the connection history 17 of the connection work plan 16 stored in the storage unit 14 to rewrite the display of the connection result 71 of the connection history 17 corresponding to the device ID 65 of the connection management device 20 to which the USB memory 50 has been connected from "unconnected" to "connected" (Step S106). When the connection state between the USB memory 50 and the connection target 30 is set to "unconnected" by the control unit 12, the connection result 71 of the device ID 65 of the connection management device 20 to which the USB memory 50 has been connected is not rewritten, and the display of the connection result 71 is kept as "unconnected".

In Step S106, when the connection result 71 of the device ID 65 of the connection work plan 16 is updated by the history update unit 22, the determination unit 21 collates whether the connection results 71 of the connection histories 17 of the connection work plan 16 include a result set as "unconnected", and the determination unit 21 determines whether there is the unconnected connection management device 20 among connection destinations of the connection work plan 16 planned in advance (Step S107).

In Step S107, when the connection results 71 of the connection histories 17 of the connection work plan 16 include no result set as "unconnected" and the determination unit 21 determines that there is no unconnected connection management device 20 among the connection destinations of the USB memory 50 planned in advance (NO in Step S107), the control unit 12 deletes the connection work plan 16 from the storage unit 14 assuming that the connection work of the USB memory 50 to the connection management devices 20 in the connection work plan 16 has been entirely completed (Step S109). As a result, it is possible to achieve reduction of a data storage load in the storage unit 14.

On the other hand, when the connection results 71 of the connection histories 17 of the connection work plan 16 include the result set as "unconnected" and the determination unit 21 determines that there is the unconnected connection management device 20 among the connection destinations of the USB memory 50 planned in advance (YES in Step S107), the processing is ended assuming that the connection work of the USB memory 50 to the connection management devices 20 in the connection work plan 16 has not been completed yet in preparation for next connection of the USB memory 50 (Step S110).

Here, the process of Step S107 will be described in detail using the connection work plan 16 of FIG. 6. As illustrated in FIG. 6, when the connection result 71 of the connection management device ID3 is "unconnected", the processing is ended assuming that the connection work of the USB memory 50 to the connection management devices 20 in the connection work plan 16 has not been completed yet (Step S110). On the other hand, when the connection result 71 of the connection management device ID3 is "connected", the control unit 12 deletes the connection work plan 16 from the storage unit 14 assuming that the connection work of the USB memory 50 to the connection management devices 20 in the connection work plan 16 has been entirely completed (Step S109).

As described above, it is possible to connect the USB memory 50 to the connection management devices 20 in accordance with the connection order determined in advance based on the connection work plan 16 according to the connection device restriction system 1 of the present example. Further, the USB memory 50 is first quarantined by setting the first connection target 30 in the quarantine device 30a in the connection work plan 16, and it is possible to reliably remove malware or the like even when the USB memory 50 has been infected with malware or the like. As a result, it is possible to reliably prevent the malware from being mixed into the connection target 30 such as the computer to which the USB memory 50 is connected and to reduce the security risk.

Although the present invention has been described based on the embodiment, the present invention is not limited to the configurations described in the above-described embodiment, and the configurations thereof can be changed as appropriate within a scope not deviating from the gist thereof. For example, the above-described embodiment has been described in detail in order to describe the present invention in an easily understandable manner, and is not necessarily limited to one including the entire configuration that has been described above. Further, configurations of another embodiment can be substituted for some configurations of a certain embodiment, and further, a configuration of another embodiment can be added to a configuration of a certain embodiment. Further, addition, deletion or substitution of other configurations can be made with respect to some configurations of each embodiment.

Further, a part or all of each of the above-described configurations, functions, processing units, processing means, and the like may be realized, for example, by hardware by designing with an integrated circuit and the like. Further, each of the above-described configurations, functions, and the like may also be realized by software by causing a processor to interpret and execute a program for realizing each of the functions. Information such as programs, tables, and files that realize the respective functions can be installed in a recording device such as a memory, a hard disk, and a solid state drive (SSD), or a recording medium such as an IC card, an SD card, and a DVD.

What is claimed is:

1. A connection device restriction system that restricts use of connection devices to be used by being connected to an electronic device, the connection device restriction system comprising:
   connection management devices each of which includes a connection port to connect the connection device and connects the connection device connected to the connection port to the electronic device;
   a control unit which controls a connection state between the connection device and the electronic device in the connection management device;
   a setting unit which sets a connection work plan in which identification information of the connection device and a connection order defining an order of the connection management devices to be connected with the connection device have been registered in advance;
   a storage unit which stores the connection work plan set by the setting unit;
   a determination unit which acquires connection information on the connection device connected to the connection management device and collates the acquired connection information with the connection work plan; and a history update unit which changes a connection history corresponding to the connection order of the connection work plan from "unconnected" to "connected" when the connection device is connected to the electronic device, wherein the control unit makes the connection state between the connection device connected to the connection management device and the electronic device when the determination unit determines that the identification information of the connection device connected to the connection management device has been registered in the connection work plan and a connection history of a connection order preceding a connection order of the connection device is "connected", and does not make the connection state between the connection device connected to the connection management device and the electronic device when the determination unit determines that the connection history of the connection order preceding the connection order of the connection device is "unconnected".

2. The connection device restriction system according to claim 1, wherein the identification information of the connection devices in the connection work plan is identification IDs which have been individually assigned to the connection devices, and the determination unit collates whether an identification ID of a connection device acquired as the connection information of the connection device connected to the connection management device matches the identification ID registered in the connection work plan, and the control unit does not make a connection state between the connection device and the electronic device when the acquired identification ID is not registered in the connection work plan.

3. The connection device restriction system according to claim 2, wherein in the connection work plan, a connection restriction period, defined by a scheduled connection start time and a scheduled connection end time, during which a connection device is connectable to the connection management device has been registered for each of the identification IDs, and the determination unit collates a connection period of a connection device acquired as the connection information of the connection device connected to the connection management device with the connection restriction period of the connection device registered in the connection work plan, and the control unit does not make a connection state between the connection device and the electronic device when the connection period of the connection device exceeds the connection restriction period.

4. The connection device restriction system according to claim 1, wherein when all connection histories corresponding to connection orders of the connection work plan are rewritten from "unconnected" to "connected" by the history update unit, the control unit deletes the connection work plan from the storage unit.

* * * * *